US008719779B2

(12) United States Patent
Kalthoff et al.

(10) Patent No.: US 8,719,779 B2
(45) Date of Patent: May 6, 2014

(54) DATA OBJECT ASSOCIATION BASED ON GRAPH THEORY TECHNIQUES

(75) Inventors: Wolfgang Kalthoff, Bad Schoenborn (DE); Jens Staeck, Sandhausen (DE); Karl Fuerst, Walldorf (DE); Volker Schott, Nussloch (DE); Peter Lang, Bad Schoenborn (DE); Manfred Walter, Schwetzingen (DE)

(73) Assignee: SAP AG, Walldorf (DE)

( * ) Notice: Subject to any disclaimer, the term of this patent is extended or adjusted under 35 U.S.C. 154(b) by 1955 days.

(21) Appl. No.: 11/026,427

(22) Filed: Dec. 28, 2004

(65) Prior Publication Data

US 2006/0143603 A1   Jun. 29, 2006

(51) Int. Cl.
*G06F 9/44* (2006.01)

(52) U.S. Cl.
USPC ............ 717/120; 717/133; 707/607; 707/664

(58) Field of Classification Search
USPC ............................................. 707/6
See application file for complete search history.

(56) References Cited

U.S. PATENT DOCUMENTS

| | | | | | |
|---|---|---|---|---|---|
| 5,745,900 | A | * | 4/1998 | Burrows | 707/102 |
| 6,119,124 | A | * | 9/2000 | Broder et al. | 707/103 R |
| 6,349,296 | B1 | * | 2/2002 | Broder et al. | 707/3 |
| 6,658,423 | B1 | * | 12/2003 | Pugh et al. | 707/102 |
| 6,701,313 | B1 | * | 3/2004 | Smith | 707/6 |
| 7,139,756 | B2 | * | 11/2006 | Cooper et al. | 707/6 |
| 2004/0003005 | A1 | | 1/2004 | Chaudhuri et al. | |
| 2004/0044689 | A1 | * | 3/2004 | Krabel et al. | 707/104.1 |
| 2004/0103103 | A1 | * | 5/2004 | Kalthoff et al. | 707/100 |
| 2004/0249789 | A1 | | 12/2004 | Kapoor et al. | |
| 2007/0071330 | A1 | * | 3/2007 | Oostveen et al. | 382/228 |

OTHER PUBLICATIONS

Matthias Jarke, Maurizio Lenzerini, Yannis Vassiliou, and Panos Vassiliadis, Fundamentals of Data Warehouses, Sep. 2002, ISBN 3-540-42089-4, pp. 62-67.
Mauricio A. Hernandez and Salvatore J. Stolfo, The Merge/Purge Problem for Large Databases, SIGMOD '95, 1995, pp. 127-138.
Dina Bitton and David J. DeWitt, Duplicate Record Elimination in Large Data Files, ACM Transactions on Database Systems, vol. 8, No. 2, Jun. 1983, pp. 255-265.
"International Application Serial No. 05028542.8-2201, Extended European Search Report mailed Oct. 1, 2007", 7 pgs.
Bilenko, Mikhail , et al., "Adaptive Name Matching in Information Integration", *IEEE Intelligent Systems*, vol. 18 No. 5, (Sep. 2003), 16-23.

(Continued)

*Primary Examiner* — Wei Zhen
*Assistant Examiner* — Matthew Brophy
(74) *Attorney, Agent, or Firm* — Schwegman, Lundberg & Woessner, P.A.

(57) ABSTRACT

Determining the association between data objects may be accomplished using any of a variety of systems and techniques. In particular implementations, a system and technique may have the ability to receive a group of data objects and execute a matching algorithm to determine duplicate data object propositions between the data objects. The system and technique also may have the ability determine whether a data object is a potential duplicate data object and, if a data object is a potential duplicate data object, determine whether the data object is a duplicate data object by examining duplicate data object propositions of a plurality of data objects that are associated with the data object through duplicate data object propositions.

29 Claims, 5 Drawing Sheets

(56) References Cited

OTHER PUBLICATIONS

Rahm, Erhard, et al., "Data Cleaning: Problems and Current Approaches", *Quarterly Bulletin of the Computer Society of the IEEE Technical Committee on Data Engineering*, (Dec. 2000),1-11.

Shahri, Hamid H., et al., "Data Mining for Removing Fuzzy Duplicates Using Fuzzy Interence", *Fuzzy Information. Processing NAFIPS '04. IEEE Annual Meeting of the Banff AB Canada* vol. 1, (Jun. 27, 2004),419-424.

* cited by examiner

DATA OBJECT ASSOCIATION BASED ON GRAPH THEORY TECHNIQUES

TECHNICAL FIELD

This invention relates to information processing and, more particularly, to data association.

BACKGROUND

With the ever increasing use of computers and the ever expanding availability of memory, more and more data is being stored, whether electronically, optically, or otherwise, for automated retrieval, processing, and presentation. Typical data may include information that allows businesses to operate.

Attaining high data quality is important to implementing successful automated operations. One aspect of data quality includes restricting the amount of duplicate data objects to a minimum because processing two or more data objects that describe the same item makes applications complicated and error prone, and, accordingly, expensive. Finding and eliminating duplicate data objects is thus quite beneficial.

One approach to finding duplicate data objects is to execute a matching algorithm between data objects. Such algorithms often return an indication of the probability that two data objects match. If two data objects probably match, one of the data objects may be deleted. If two data objects might match, an inspection may be made to determine whether the data objects match or not.

SUMMARY

The association, if any, between data objects may be enhanced by using graph theory techniques. In one general aspect, a process for determining associations between data objects may include receiving a group of data objects and executing a matching algorithm to determine duplicate data object propositions between the data objects. A data object may, for example, represent a business object, and a duplicate data object proposition may indicate that two data objects are potential duplicates of each other and the certainty of the duplication. The process may also include determining whether a data object is a potential duplicate data object and, if a data object is a potential duplicate data object, determining whether the data object is a duplicate data object by examining duplicate data object propositions of a plurality of data objects that are associated with the data object through duplicate data object propositions. The process may be implemented and/or facilitated by a machine, a set of instructions encoded in a machine readable medium, or otherwise.

The process may also include generating a user interface including representations of the data objects and the duplicate data object propositions. A duplicate data object proposition may, for example, be represented as a connection between associated data objects. Data objects associated by duplicate data object propositions may be visually grouped.

A data object found to be a duplicate data object may be deleted. In certain implementations, a portion of the data from the data object to be deleted may be incorporated into a surviving data object.

Determining whether a potential duplicate data object is a duplicate data object may include examining the certainty of a duplicate data object proposition between the potential duplicate data object and an associated data object and/or examining duplicate data object propositions between the potential duplicate data object and a number of other data objects. Examining duplicate data object propositions between the potential duplicate data object and a number of other data objects may include examining the consistency of duplicate data object propositions between the potential duplicate data object and the other data objects.

Duplicate data object propositions may include likely duplicate propositions and ambiguous duplicate propositions. A potential duplicate data object may be a duplicate data object if the duplicate data object propositions between it and other data objects are likely duplicate propositions. Determining whether a potential duplicate data object is a duplicate data object may include resolving ambiguous duplicate propositions and/or resolving conflicting duplicate propositions.

The process may additionally include evaluating the matching strategy. Evaluating the matching strategy may include identifying groups of data objects associated by at least ambiguous duplicate propositions and comparing the number of data object groups that are cliques to the number of data object groups that are not cliques. Evaluating the matching strategy may also include examining the number of data objects in a clique.

Various implementations may have one or more features. For example, by allowing contemporaneous inspection of the duplicate propositions for groups of potentially associated data objects, the probability that accurate, consistent decisions are made is increased. As another example, a decision regarding whether a potential duplicate data object is actually a duplicate data object may be enhanced by contemporaneous inspection of the duplicate propositions. The more consistent the duplicate propositions that two potentially duplicate data objects have with other data objects, the more that confidence may be developed regarding whether the data objects are actually duplicates. As an additional example, working on the level of graphs allows for the monitoring of the overall quality and conformity of matching strategies and/or the inspected data. Also, the matching strategy may also be checked for reasonableness.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1B:
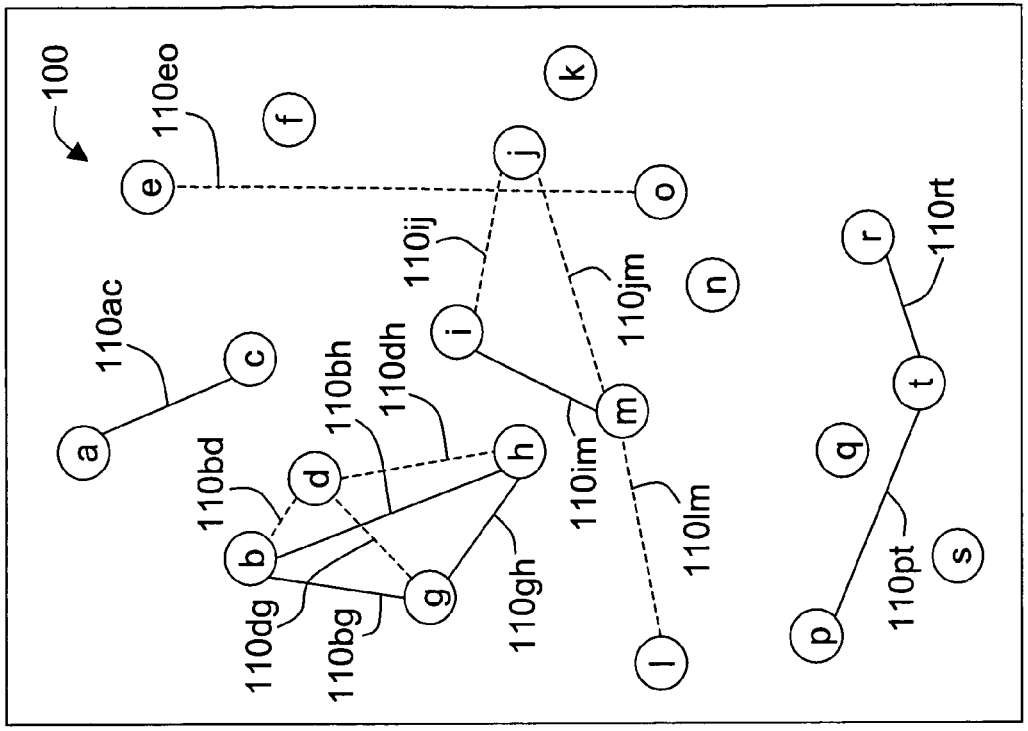
FIGS. 1A-D are data object diagrams that illustrate one implementation of a process for determining the association between data objects.
Figure 1A:
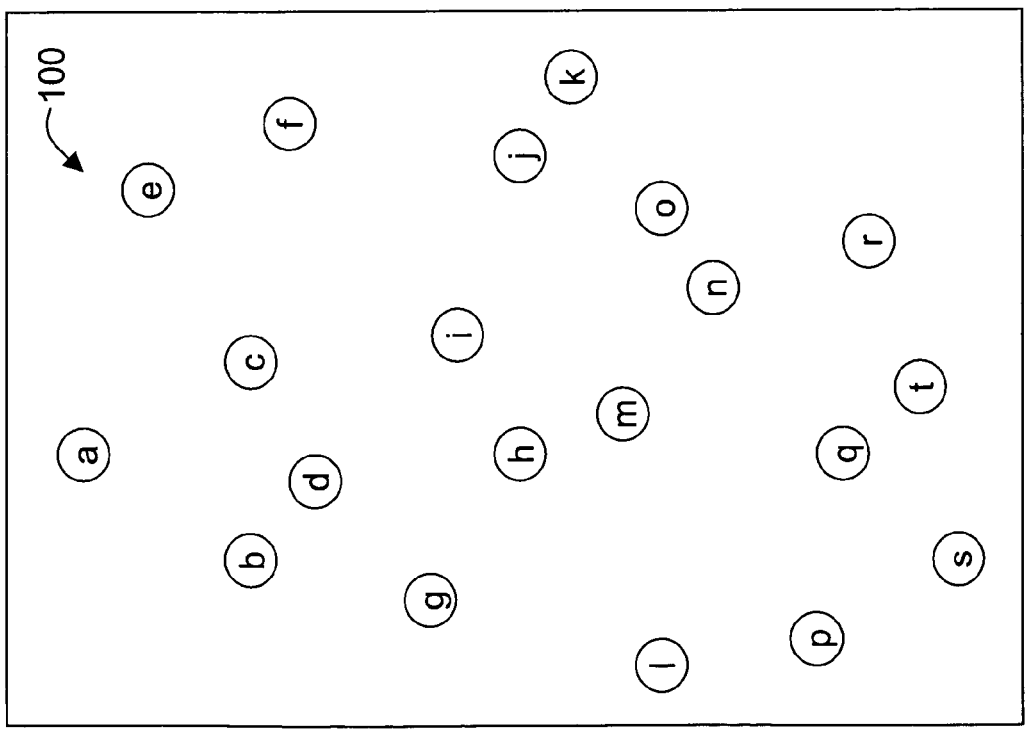

Determining the association, if any, between data objects may provide increased efficiency and performance in storing, processing, and presenting the data objects. In certain implementations, a data object association process to find duplicate data objects may be enhanced by using graph theory. In particular, the association between data objects may be enhanced by establishing a graph, whether visual, described, or otherwise, including data objects and duplicate propositions between the data objects, which may be determined by an appropriate matching algorithm. Based on the graph, a determination may be made regarding whether a data object is a duplicate data object. If a data object is a duplicate data object, the data object may be deleted. Other implementations, however, are possible.

FIGS. 1A-D illustrate a process for determining the association, if any, between a group of data objects 100. Data objects 100 may describe any appropriate items, such as, for example, people, systems, or processes. A person, for example, may be described by his name, age, address, and phone number. Data objects 100 may, for example, be records in a data base. The spacing and arrangement of data objects 100 in FIG. 1A may or may not have any correlation with their association.

Once data objects 100 have been received, whether from a remote system, through user input, from a local subsystem, or otherwise, a matching algorithm may be executed to determine which, if any, of the data objects are potentially associated with each other. A matching algorithm may, for example, be executed between various text strings and numeric values in various fields of records. The matching may be performed on a literal and/or contextual basis. A variety of matching algorithms are well known to those skilled in the art.

The matching algorithm may provide varying degrees of likelihood that data objects are duplicates. The fact that two data objects may be duplicates will be referred to as a duplicate proposition. The duplicate proposition may also include the likelihood that the data objects are duplicates.

In particular implementations, matching may involve comparing two data objects regarding their similarity and/or differences and returning an indication of the likelihood that they are duplicates. For example, a ranking number W may be assigned that indicates the likelihood of duplication. The ranking number W may, for instance, be normalized to the interval [0, 1], and the results of executing the matching algorithm on three data objects X, Y, Z may be statements of the form:

$W(X,Y)=0.7;$ $W(Y,Z)=0.2;$ and $W(Z,X)=0.4$

An appropriate decision criteria may be established for determining the meaning of the ranking number W. For example, a three-tiered classification structure may be implemented, with the first tier indicating that the objects probably do not match, the second tier indicating that the objects may or may not match, and the third tier indicating that the objects probably do match. This may be expressed by the following formula:

If $W(A,B)<T_1$, then $A$ and $B$ probably do not match;

if $T_1 \leq W(A,B)<T_2$, then $A$ and $B$ may or may not match; and if $W(A,B) \geq T_2$, then $A$ and $B$ probably do match, where $T_1$ and $T_2$ are classification thresholds.

The classification thresholds $T_1$ and $T_2$ may be any appropriate values. For instance, $T_1$ may be 0.25 and $T_2$ may 0.75. Of course, other numbers of tiers could be established for a classification system (e.g., two or four).

FIG. 1B illustrates objects 100 with connections 110 indicating the data objects that may be duplicates. Connections 110 also indicate the likelihood that data objects are duplicates. Connections 110 can be considered to represent the duplicate propositions. In FIG. 1B, the duplicate propositions that indicate ambiguity regarding duplication are represented by dashed connections, and the duplicate propositions that indicate likelihood of duplication are represented by solid connections. Of course, any other type of duplicate proposition representation scheme could be used (e.g., connection weights or connection colors). For objects that have no connection between them, there is a low likelihood that they are duplicates. This indication technique is well suited for the three-tier classification scheme discussed previously.

Using the duplicate propositions between a group of data objects, the data objects in a group of data objects may be considered as nodes of a complete graph $K_n$, where the edge values correspond to a ranking number W. The graph in FIG. 1B may be derived from the complete graph $K_n$, for example, by assigning an edge if $W \geq T_1$. The dashed connections (a connection representing an edge) would result from a ranking number W with $T_1 \leq W < T_2$ (i.e., the two data objects may or may not be duplicates), and the solid connections would result from a ranking number W with $T_2 \leq W \leq 1$ (i.e., the two data objects probably are duplicates). This graph has several data object groupings, which are disjoint sub graphs being maximal with respect to the property that there exists an edge trail between each node of the sub graph. The sub graphs are disjoint because, by definition, any connection between two sub graphs would cause them to be one larger sub graph.

Figure 1C:
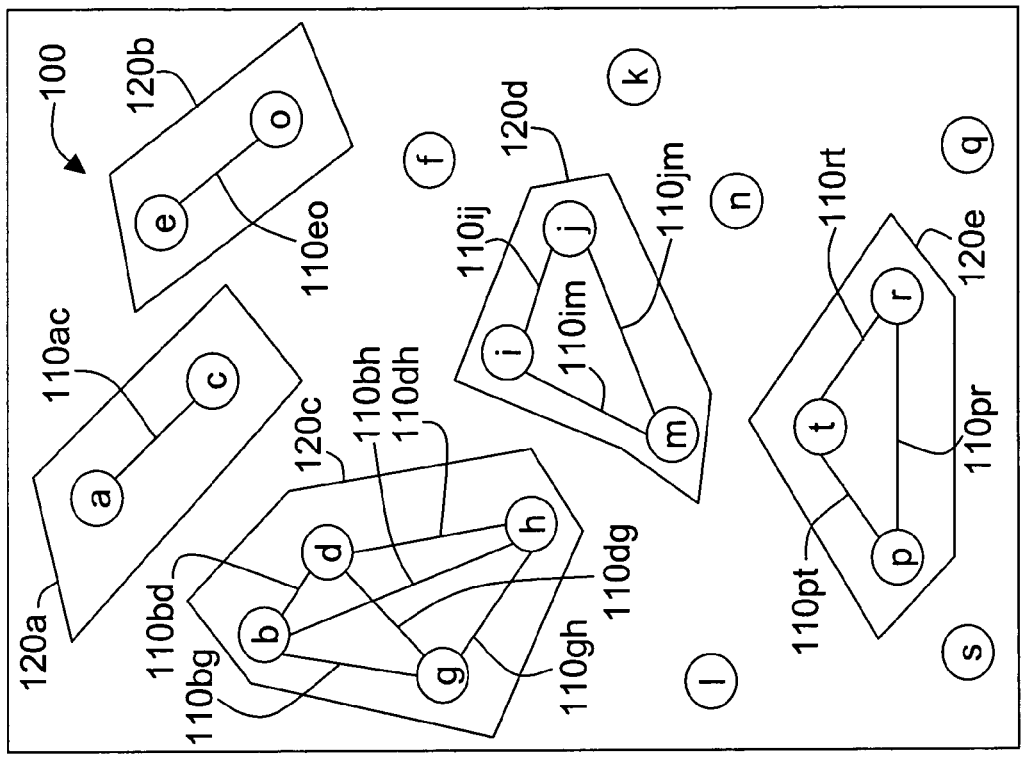

FIG. 1C illustrates a grouping of the data objects based on whether they may be duplicates of each other. This could also be viewed as grouping the data objects based on whether they are coupled to each other by one or more of connections 110, the connections representing the association of the data objects based on the duplicate propositions. For the object associations in FIG. 1B, five groups 120 are formed. Groups 120 are maximal sub graphs having the property that there exists an edge trail between each pair of entities. In FIG. 1C, the grouping is accomplished by rearranging data objects 100 and defining boundaries around the coupled data objects.

FIG. 1C may facilitate an enhanced understanding of the potential duplication among data objects. This may be accomplished by examining the strength and/or consistency of the edges of the sub graphs (i.e., the connections between the data objects).

In group 120c, for example, because it may readily be seen that the matching algorithm is indicating that data object 100b and data object 100g are probably duplicates of each other, data object 100g and data object 100h are probably duplicates of each other, and data object 100h and data object 100b are probably duplicates of each other, a high degree of confidence may be developed that data object 100b, data object 100g, and data object 100h are duplicates of each other due to the consistency of the duplicate propositions between the objects. Also, the fact that data object 100b, data object 100g, and data object 100h might be duplicates of data object 100d reinforces this conclusion because it again indicates a high degree of consistency for the duplicate propositions of the data objects.

The data objects in group 120c may be considered a clique because each data object is connected to the other data objects in the group. In graph theory terminology, a clique is a maximal sub graph having the property that each pair of entities are connected by an edge (i.e., a complete sub graph).

In contrast to the consistency that may be readily observed in group 120c, group 120e may be readily observed to have a glaring inconsistency. In group 120e, it may readily be seen that data object 100p and data object 100t are probably duplicates of each other, data object 100t and data object 100r are probably duplicates of each other, and data object 100*r* and data object 100*p* are probably not duplicates of each other. At a rudimentary level, this indicates a violation of transitive equality (i.e., if A=B and B=C, then A=C). Thus, the confidence that data object 100*p* and data object 100*t* are probably duplicates of each other and that data object 100*t* and data object 100*r* are probably duplicates of each other may be reduced.

As discussed above, by being able to examine the potential associations between data objects, a lower or higher degree of confidence in decisions to delete data objects may be provided. Also, the examination may provide insight into which associations need to be investigated further before making a final duplicate/non-duplicate decision.

Group 120*e* may be considered a non-clique graph. Basically, a non-clique graph has some elements that are not coupled directly to each other. These graphs, therefore, cannot be resolved without contradicting propositions made by the matching algorithm.

The final decision regarding duplication may be performed either manually or automatically. One technique for achieving the final duplication decision involves examining the groups that are cliques. If the connections between the data objects in a clique are of ranking number $W \geq T_2$, the data objects may be deleted with a fairly high degree of confidence that they are duplicates.

For example, if the matching algorithm indicates that the data objects of a group are associated with each other as probable duplicates (e.g., in FIG. 1C, the data objects of a coupled group would have a solid connection to the other members of the group), the duplicate data objects in the group may be deleted. An example, of such a group in FIG. 1C is group 120*a*.

Determining which data object to keep of a group of data objects determined to be duplicates may be made based on one or more appropriate criterions. For example, the older data object(s) may be deleted, because there is typically a higher probability that younger data objects are more up to date. As another example, the data object with the best data quality may be kept. As a further example, a data object that is used more often may be kept. Before deleting a data object, however, it may be useful to update existing references. For instance, if a business partner object is to be deleted, existing contacts with the business partner may be updated.

Other groups may have to be inspected more closely to determine whether their data objects are duplicates or not. For example, group 120*b* in FIG. 1C may have to be inspected because the association between data object 100*e* and data object 100*o* indicates that the data objects may or may not be duplicates (e.g., the rank W has a value $T_1 \leq W < T_2$). The inspection may, for example, be accomplished by determining which portion of the matching algorithm is generating the potential association or disassociation or executing another matching algorithm.

Also, group 120*c* may have to be checked because the duplicate propositions for data object 100*d* are ambiguous. Since the data objects in group 120*c* form a clique, confirming the associations with data object 100*d* should provide a consistent decision.

Group 120*d* and group 120*e* may have to be checked for a variety of reasons. First, there are some duplicate propositions that are ambiguous (e.g., the value of a ranking number W is $T_1 \leq W < T_2$). Additionally, the data objects of the groups do not form a clique (e.g., data object 100*l* is currently only connected with data object 100*m*). For group 120*e*, for example, although the associations that exist are strong (e.g., the value of a ranking number W is $W \geq T_2$), the data objects of the group do not form a clique (i.e., there is no connection (edge) between data object 100*p* and data object 100*r*).

Figure 1D:
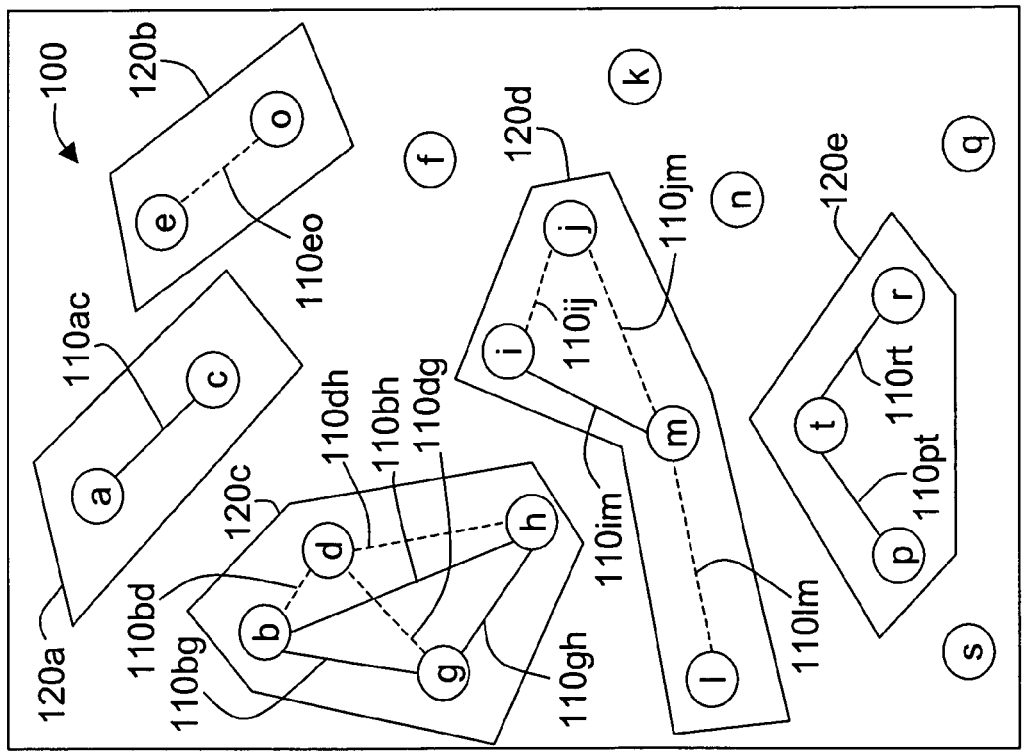

Once the inconsistencies and/or ambiguities in data object groups have been resolved, the data object groups containing duplicate data objects may be cliques with likely-duplicate indicating connections between the data objects. Data objects that are determined not to be probable duplicates of other data objects in the groups may be removed from the group. An example of a resolution is shown in FIG. 1D. The duplicate data objects may be deleted at this time.

In particular implementations, a portion of the data of a data object to be deleted may be incorporated into a surviving data object. For example, if a portion of the data is not common between the data objects, this data may be incorporated into the surviving data object. This could happen, for instance, if a surviving customer data object includes five-digit zip codes, but a customer data object to be deleted includes nine-digit zip codes. The extra four digits of the zip codes in the data object to be deleted could then be incorporated into the surviving data object. Thus, the data of the data object to be deleted may be used to enrich the data of the surviving data object.

The process illustrated by FIGS. 1A-D has a variety of features. For example, it increases the probability that accurate, consistent decisions are made because viewing groups of coupled data objects allows contemporaneous inspection of the related duplicate propositions. Thus, inconsistencies, such as, for example, transitivity violations, that may result from making decisions based on isolated duplicate propositions be readily identified. As another example, the decision regarding whether a potential duplicate data object is actually a duplicate data object is enhanced by contemporaneous inspection of the potential associations. The more consistent associations that two potentially duplicate data objects have with other data objects, the more that confidence may be developed regarding whether the data objects are actually duplicates. This is readily observed in a clique group where the associations indicate that the data objects are probably duplicates of each other. This can also lead to increased efficiency in making duplicate decisions. As an additional example, working on the level of graphs also allows for the monitoring of the overall quality and conformity of matching strategies and/or the inspected data objects. To this end, the consistency may be measured as the ratio of connectivity components being cliques to the number of connectivity components being non-cliques. The higher the ratio is, the better the consistency. The matching strategy may also be checked for reasonableness. This may, for instance, be checked by investigating the distribution of the size of groups and cliques. For example, a result indicating that a large proportion of data objects are probable duplicates could be an indication of a deficiency in the matching algorithm. The process may be used in most any situation where comparisons of data objects need to be evaluated. This includes matching, search, automatic taxonomies, and the like.

Other implementations may include additional operations. For example, other information regarding associations between data objects could be included in the data object graph. Such information could, for example, come from previous matching algorithms or inspections. This information could, for example, be used to supplement duplicate propositions provided by the matching algorithm.

In particular implementations, it may be useful to prevent data objects from being modified while they are being analyzed for duplication. For example, when multiple users and/or systems are being used to analyze data objects, it may be useful to prevent data objects of one group from being processed in parallel during the duplicate decision process because the decisions may contradict. Therefore, the data objects of the groups may be locked against parallel activities. For instance, if one user takes a data object in his "operation queue," the data objects in the group associated with the data object may be locked, as opposed to locking the data object and the data object(s) with which the data object has a duplicate proposition. Therefore, the locking granularity may be on the data objects.

Figure 2:
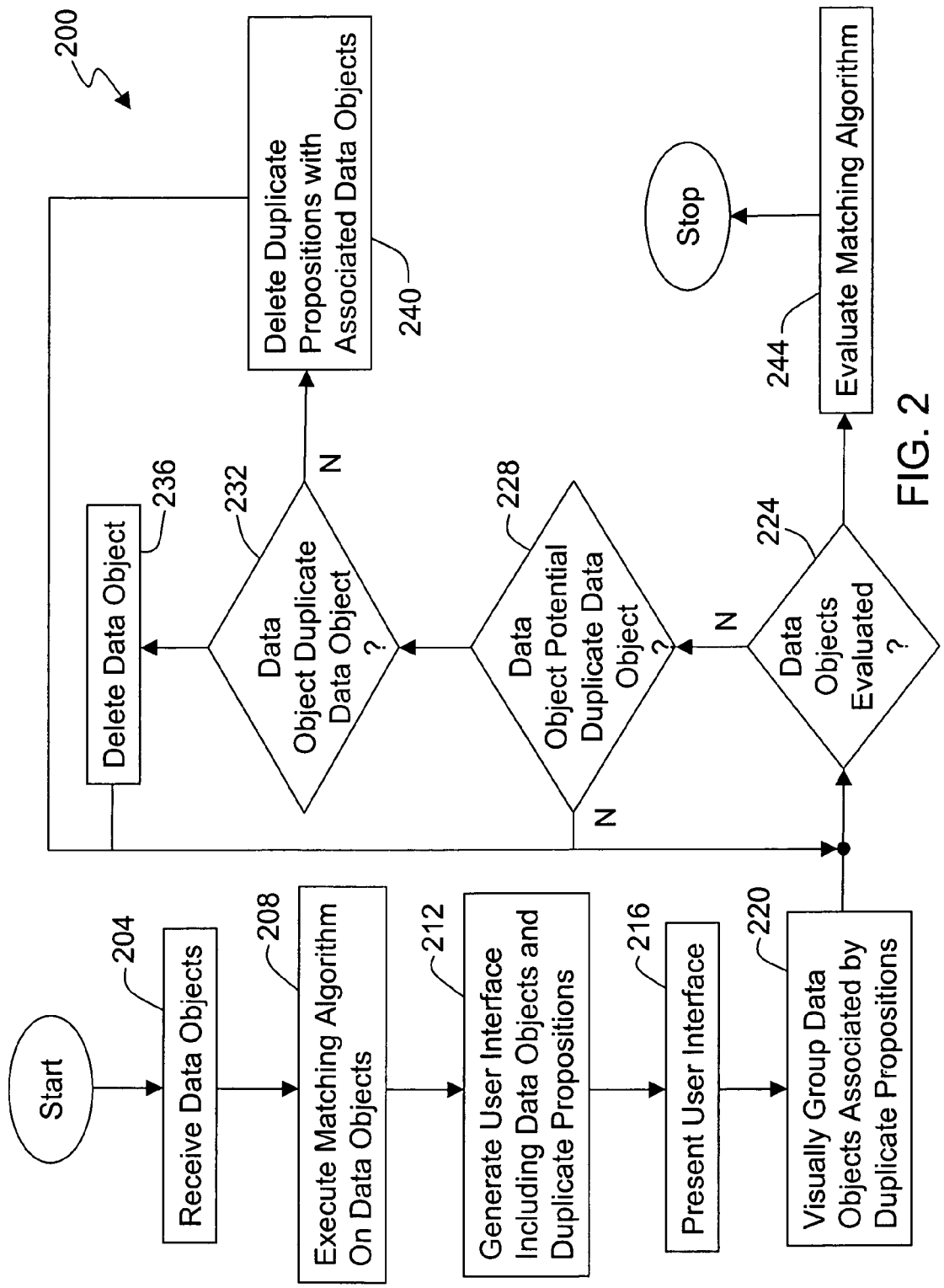
FIG. 2 is a flow chart that illustrates another implementation of a process for determining the association between data objects.

FIG. 2 illustrates a process 200 for determining the association between data objects. Process 200 may be similar to the process illustrated by FIGS. 1A-D and may be implemented by a computer (e.g., personal computer or workstation) or other information processing device.

Process 200 begins with receiving a group data objects (operation 204). The data objects may be received from any of a variety of locations, whether local or remote. In particular implementations, the data objects are from back-end systems (e.g., databases) of an enterprise system.

A matching algorithm is then executed on the data objects (operation 208). The matching algorithm may examine any appropriate portion(s) of the data objects and use any appropriate comparison criteria (e.g., literal or contextual) to determine whether two data objects are potential duplicates. The matching algorithm may produce any appropriate indication regarding the potential duplication between data objects. For example, a three-tiered classification system may be used (e.g., probably do not match, may or may not match, and probably do match).

The data objects and duplicate propositions, which are based on the indications regarding potential duplication between data objects, are incorporated into a user interface (operation 212). The data object propositions may, for example, be represented as connections between data objects. Various stylization of the connections may be used to indicate the certainty of a duplicate proposition. The user interface, which may, for example, be a graphical user interface, may then be presented to a user (operation 216).

The process continues with visually grouping data objects associated by duplicate propositions (operation 220). This may, for example, be accomplished by reorganizing the data objects in the user interface to bring associated data objects closer to each other and/or defining boundaries around associated data objects. The grouping may reduce the number of duplicate proposition representations that cross other data object groups.

A determination is made regarding whether the data objects have been evaluated in regards to whether any potential duplicate data objects are actually duplicate data objects (operation 224). If the evaluation has not been performed, process 200 calls for determining whether a data object is a potential duplicate data object (operation 228). This may, for example, be accomplished by determining whether the data object has an associated duplicate proposition with any other data object, based on a visual observation of duplicate propositions, ranking number, or otherwise. If the data object is not a potential duplicate data object (i.e., it has no proposed duplicate association with any other data object), the process calls for returning to check whether the data object evaluation is complete (operation 224).

If the data object is a potential duplicate data object (e.g., it has a proposed duplicate association with at least one other data object), process 200 calls for determining whether the data object is a duplicate data object (operation 232). This may, for example, include examining duplicate data object propositions of a plurality of data objects that are associated with the data object through duplicate data object propositions. The examination may, for instance, reveal whether the data object is a probable duplicate of any other data objects with which it is associated. This may include examining the certainty and/or consistency of duplicate propositions. Also, the relations between an associated group of data objects may be resolved. If the data object is not a duplicate data object, the process calls for deleting the duplicate proposition between the data object and the associated data objects (operation 240) and returning to check whether the data objects have been evaluated (operation 224). If, however, the data object is a duplicate data object, the process calls for deleting the data object (operation 236) and returning to check whether the data objects have been evaluated (operation 224).

Once the data objects have been evaluated, the process calls for evaluating the matching algorithm (operation 244). The matching algorithm may be evaluated based on any appropriate criteria. For example, the matching algorithm may be evaluated based on the number of data object groups that are cliques versus the number of data object groups that are not cliques and/or the number of data objects in a clique.

Although FIG. 2 illustrates one process for determining the association between data objects, other processes may include fewer, additional, and/or a different arrangement of operations. For example, a process may call for visually grouping coupled data objects before generating the user interface including the data objects and the duplicate propositions. As another example, a process may not call for visually grouping coupled data objects or generating the user interface. As an additional example, a process may call for deleting a data object that is found to be a duplicate data object after the other data objects have been evaluated. As a further example, a process may call for updating the user interface as data objects are visually grouped and/or decisions are made regarding whether an object is a duplicate object. For the latter, for example, duplicate propositions could be removed or altered depending on the decision.

In particular implementations, a decision may be made regarding which duplicate data object is to be deleted. Determining which data object to delete of a group of data objects determined to be duplicates may be based on one or more appropriate criterions, such as, for example, age, data quality, or frequency of use. Before deleting a data object, it may be useful to incorporate a portion of the data from the data object to be deleted into a surviving data object.

Figure 3:
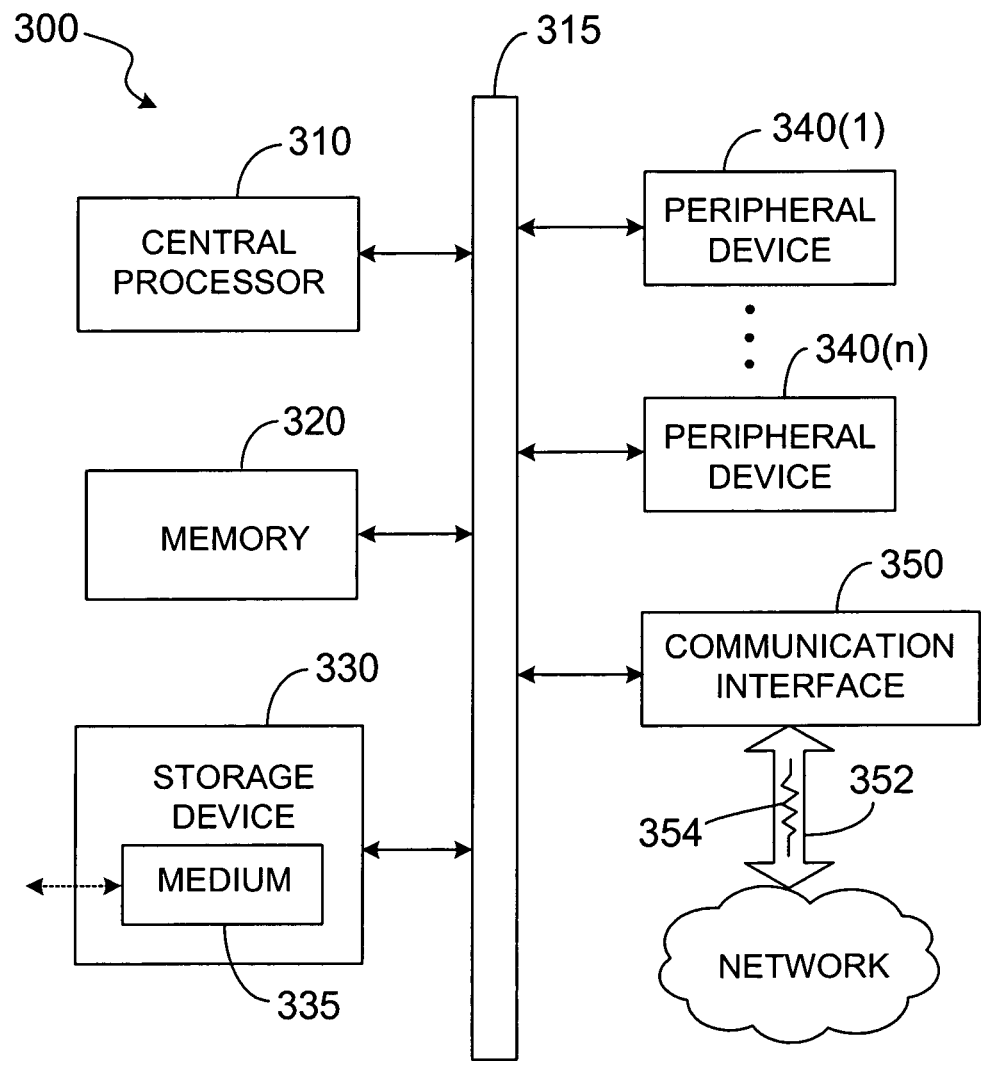
FIG. 3 is a block diagram illustrating a system for determining the association between data objects.

FIG. 3 illustrates one implementation of an information processing system 300. Information processing system 300 may at least facilitate determining the association of data objects.

Information processing system 300 includes a central processor 310, which can execute programs, perform data manipulations, and control tasks in system 300. Central processor 310 is coupled to a bus 315, which may, for example, be composed of multiple busses, whether parallel or serial.

Information processing system 300 also includes a memory 320 and a storage device 330. Memory 320 may provide volatile and/or non-volatile information storage and is coupled to bus 315. System 300 also may include one or more cache memories. Storage device 330 provides the ability for accessing a medium 335, which may be removable, read-only, or read/write media and may be magnetic-based, optical-based, semiconductor-based media, or a combination of these.

Information processing system 300 may additionally include one or more peripheral devices 340(1)-340(n) (collectively, devices 340). Information processing system may include one or more controllers and/or adapters for providing interface functions.

System 300 further includes a communication interface 350, which can allow software and data to be transferred, in the form of signals 354 over a channel 352, between system 300 and external devices, networks, or information sources. Signals 354 may embody instructions for causing system 300 to perform operations.

System 300 may be a programmable machine, and may include various devices such as embedded controllers, Programmable Logic Devices (PLDs), Application Specific Integrated Circuits (ASICs), and the like. Machine instructions (also known as programs, software, software applications or code) may be stored in system 300, possibly in memory 320, and/or delivered to system 300 over communication interface 350. These instructions, when executed, enable system 300 to perform the various features and operations. These instructions may represent controllers of system 300 and may be implemented in a high-level procedural language, object-oriented programming language, and/or assembly/machine language. Such languages may be compiled and/or interpreted languages.

As used herein, the term "machine-readable medium" refers to any computer program product, apparatus, and/or device used to provide machine instructions and/or data to system 300, including a machine-readable medium. Examples of a machine-readable medium include medium 335, memory 320, and/or PLDs, FPGAs, ASICs, and the like.

In one mode of operation, system 300 receives a group data objects through communication interface 350. The data objects may have been previously requested by system 300. System 300 stores the data objects in memory 320.

Then, in accordance with instructions in memory 320, processor 310 executes a matching algorithm on the data objects. The matching algorithm may produce any appropriate indication regarding potential duplication between the data objects. Processor 300 also generates a user interface including the data objects and duplicate propositions, which are based on the indications regarding potential duplication between the data objects. The user interface is then visually presented using one of peripheral devices 340 acting as a display (e.g., CRT or LCD).

Processor 310 also visually groups the data objects coupled by duplicate propositions. This grouping may be done in response to user commands or according to an algorithm and generally includes reorganizing the data objects in the user interface to facilitate identifying coupled data objects.

Processor 310 may also facilitate determining whether a data object is a potential duplicate data object and, if a data object is a potential duplicate data object, determining whether the data object is a duplicate data object. Determining whether a data object is a potential duplicate data object may include determining whether a data object has an associated duplicate proposition with any other data object and may be accomplished, based on a visual observation of duplicate propositions, ranking number, or otherwise. Determining whether a data object is a duplicate data object may include determining whether the data object is a probable duplicate of any other data objects to which it is coupled. If a data object is not a duplicate data object, the duplicate propositions for the data object may be removed. If, however, the data object is a duplicate data object, the data object may be deleted.

Processor 310 may also evaluate the matching algorithm. The matching algorithm may be evaluated based on any appropriate criteria. For example, the matching algorithm may be evaluated on the basis of the consistency of associations between data objects of a group.

Figure 4:
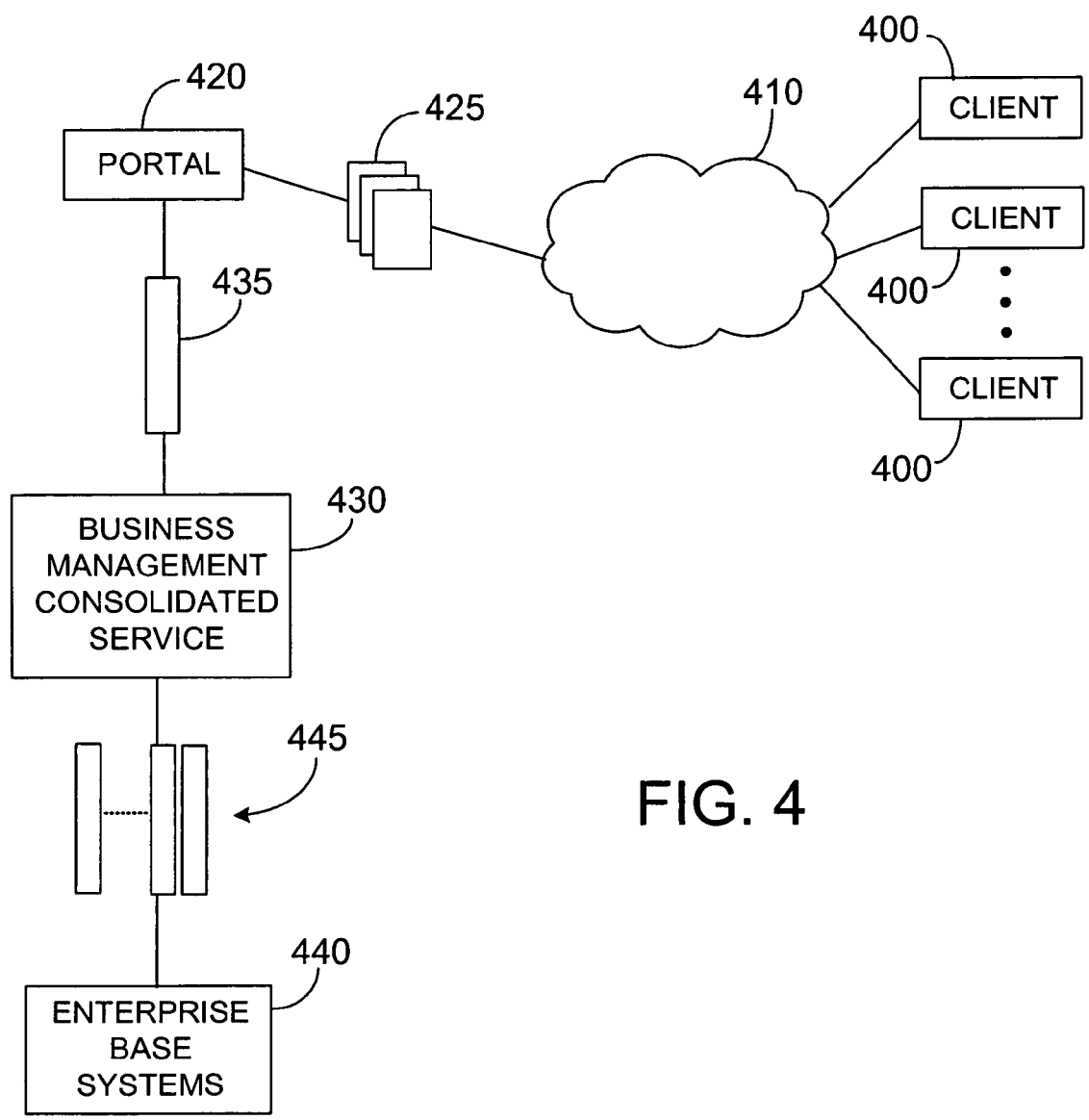
FIG. 4 is a block diagram illustrating a system for determining the association between data objects.

FIG. 4 illustrates an example integrated business management system 400 that may contain and process data objects. Multiple clients 400 may access data over a network 410 through a portal 420. Clients 400 may be systems or processes running on systems. Network 410 may be any communication network linking machines capable of communicating using one or more networking protocols. Network 410 may, for example, be a local area network (LAN), a metropolitan area network (MAN), a wide area network (WAN), an enterprise network, a virtual private network (VPN), or the Internet. Clients 400 may be any systems or processes capable of communicating over network 410. Clients 400 may, for example, be Web Browsers and may be communicatively coupled with network 410 through a proxy server.

Portal 420 provides a common interface to program management services. Portal 420 receives requests from clients 400 and generates data views 425 (e.g., Web pages) in response. Portal 420 may implement a user role based system to personalize the common interface and data views 425 for a user of one of clients 400. A user may have one or more associated roles that allow personalized tailoring of a presented interface through the generated data views 425.

Portal 420 communicates with a business management system 430 that consolidates multiple application services. Portal 420 receives data 435 from business management system 430 for use in fulfilling the requests from clients 400. Business management system 430 provides integrated application services to manage business objects in a business enterprise. The business objects may be resources (e.g., human resources), development projects, business programs, inventories, clients, accounts, business products, and/or business services. A data object may represent part of a business object.

Business management system 430 communicates with enterprise base systems 440 to obtain multiple types of data 445. Enterprise base systems 440 may include various existing application services, such as human resource management systems, financial management systems, project management systems, time management systems, and electronic file and/or mail systems. Business management system 430 may consolidate and integrate the data and functionality of such systems into a single business management tool.

Portal 420, business management system 430, and enterprise base systems 440 may reside in one or more programmable machines, which may communicate over a network or one or more communication busses. For example, base systems 440 may reside in multiple servers connected to an enterprise network, and portal 420 and business management system 430 may reside in a server connected to a public network. Thus, a user of the system may access and manage business programs and resources through a single portal from anywhere that access to a public network is available.

In one mode of operation, clients 400 may be used for determining the association between data objects stored in base systems 440. Duplication determinations similar to those discussed previously may be used once one of the clients receives a group of data objects. A data object may be deleted from base systems 440 if a duplicate determination is made.

A number of implementations have been described in detail, and various others have been mentioned or suggested. Nevertheless, numerous additions, deletions, substitutions, and modifications to these implementations may be suggested to those of skill in the art while still accomplishing data association. Accordingly, the invention is to be measured by the appended claims, which may encompass one or more of the implementations.

The invention claimed is:

1. A method for determining associations between data objects, the method comprising:
   for a group of data objects including a first data object, a second data object, and a third data object, executing a matching algorithm to determine one or more duplicate data object propositions among the data objects, a duplicate data object proposition between two objects indicating a possibility that the two objects are duplicates of each other;
   detecting a duplicate data object proposition between the first data object and the second data object;
   identifying the first data object as a potential duplicate of the second data object based on the duplicate data object proposition between the first data object and the second data object; and
   in response to the identifying of the first data object as a potential duplicate of the second data object, determining whether the first data object identified as a potential duplicate of the second data object is an actual duplicate of the second data object by examining one or more duplicate data object propositions including at least a duplicate data object proposition between the third data object and the first data object.

2. The method of claim 1, wherein the first data object represents a business object.

3. The method of claim 1, further comprising generating a user interface including representations of the data objects and the duplicate data object propositions.

4. The method of claim 3, wherein a duplicate data object proposition is represented as a connection between associated data objects.

5. The method of claim 3, further comprising visually grouping data objects associated by duplicate data object propositions.

6. The method of claim 1, wherein determining whether the first data object is an actual duplicate of the second data object comprises examining the certainty of the duplicate data object proposition between the first data object and the third data object.

7. The method of claim 1, wherein determining whether the first data object is an actual duplicate of the second data object comprises examining duplicate data object propositions between the first data object and a plurality of data objects including the third data object.

8. The method of claim 7, wherein examining duplicate data object propositions between the first data object and the plurality of data objects comprises examining the consistency of duplicate data object propositions between the first data object and the plurality of data objects.

9. The method of claim 1, wherein examining duplicate data object propositions involving a third data object comprises:
   examining the certainty of a duplicate data object proposition between the first data object and the second data object; and
   examining the duplicate data object proposition between the first data object and the third data object.

10. The method of claim 1, wherein a duplicate data object proposition is at least one of a likely duplicate proposition and an ambiguous duplicate proposition.

11. The method of claim 1, wherein determining whether the first data object is an actual duplicate of the second data object comprises resolving an ambiguous duplicate proposition.

12. The method of claim 1, wherein determining whether the first data object is an actual duplicate of the second data object comprises resolving conflicting duplicate data object propositions.

13. The method of claim 1, further comprising evaluating the matching algorithm.

14. The method of claim 13, wherein evaluating the matching strategy comprises:
   identifying groups of data objects associated by at least ambiguous duplicate propositions; and
   comparing the number of data object groups that are cliques to the number of data object groups that are not cliques.

15. The method of claim 13, wherein evaluating the matching strategy comprises examining the number of data objects in a clique.

16. The method of claim 1, further comprising deleting the second data object if it is an actual duplicate of the first data object.

17. The method of claim 16, further comprising incorporating a portion of the data from the second data object into the first data object.

18. A system for determining associations between data objects, the system comprising:
   a machine-readable medium operable to store a group of data objects including a first data object, a second data object, and a third data object, the machine-readable medium comprising a plurality of instructions; and
   a processor coupled to the medium, the processor operable to execute the instructions to perform operations comprising:
      executing a matching algorithm to determine duplicate data object propositions among data objects from the group of data objects,
      detecting a duplicate data object proposition between the first data object and the second data object, identifying the first data object as a potential duplicate of the second data object based on the duplicate data object proposition between the first data object and the second data object; and
      in response to the identifying of the first data object as a potential duplicate of the second data object, determining whether the first data object identified as a potential duplicate of the second data object is an actual duplicate of the second data object by examining one or more duplicate data object propositions including at least a duplicate data object proposition between the third data object and the first data object.

19. The system of claim 18, wherein the operations performed when the processor executes the instructions further comprise generating a user interface including representations of the data objects and the duplicate data object propositions.

20. The system of claim 19, further comprising a display coupled to the processor, the display operable to visually present the user interface.

21. The system of claim 19, wherein the operations performed when the processor executes the instructions further comprise visually grouping data objects that are associated through duplicate data object propositions.

22. The system of claim 18, wherein determining whether the first data object is an actual duplicate of the second data object comprises examining the certainty of the duplicate data object proposition between the first data object and the third data object.

23. The system of claim 18, wherein determining whether the first data object is an actual duplicate of the second data object comprises examining duplicate data object propositions between the first data object and a plurality of data objects including the third data object.

24. The system of claim 18, wherein a duplicate data object proposition is at least one of a likely duplicate proposition and an ambiguous duplicate proposition.

25. The system of claim 18, wherein the operations performed when the processor executes the instructions further comprise evaluating the matching algorithm.

26. The system of claim 18, wherein the operations performed when the processor executes the instructions further comprise deleting the second data object if it is an actual duplicate of the first data object.

27. The system of claim 26, wherein the operations performed when the processor executes the instructions further comprise incorporating a portion of the data from the second data object into the first data object.

28. The method of claim 1, comprising:
   detecting a duplicate data object proposition between the third object and the second object; and
   determining that the first data object is an actual duplicate of the second data object.

29. The method of claim 1, comprising:
   detecting an absence of a duplicate data object proposition between the third object and the second object; and
   determining that the first data object is not an actual duplicate of the second data object.

* * * * *